United States Patent [19]
Schneider

[11] Patent Number: 5,920,994
[45] Date of Patent: Jul. 13, 1999

[54] BOW SAW

[75] Inventor: Manfred Schneider, Wendel, Germany

[73] Assignee: Wolf-Gerate GmbH Vertriebsgellschaft KG, Germany

[21] Appl. No.: 08/750,928

[22] PCT Filed: Jul. 31, 1995

[86] PCT No.: PCT/EP95/03047

§ 371 Date: Sep. 19, 1997

§ 102(e) Date: Sep. 19, 1997

[87] PCT Pub. No.: WO96/04778

PCT Pub. Date: Feb. 22, 1996

[30] Foreign Application Priority Data

Aug. 10, 1994 [DE] Germany .............................. 44 28 345

[51] Int. Cl.[6] .................................................. B23D 51/00
[52] U.S. Cl. .................................. 30/510; 30/507; 30/517
[58] Field of Search .................................. 30/166.3, 507, 30/509, 510, 511, 514, 517

[56] References Cited

U.S. PATENT DOCUMENTS

| | | | |
|---|---|---|---|
| 1,484,168 | 2/1924 | Bertas et al. | 30/507 |
| 1,697,088 | 1/1929 | Reed | 30/166.3 |
| 1,949,196 | 2/1934 | Youlten et al. | 30/510 |
| 1,995,679 | 3/1935 | Kelley | 30/507 |
| 2,613,709 | 10/1952 | Terrill | 30/511 |
| 4,328,848 | 5/1982 | Miller | 30/507 |

FOREIGN PATENT DOCUMENTS

| | | |
|---|---|---|
| 431396 | 9/1926 | Germany . |
| 804864 | 4/1951 | Germany .................................. 30/507 |
| 7425295 | 11/1974 | Germany . |
| 3130703 | 10/1983 | Germany . |
| 9412886 | 10/1994 | Germany . |

*Primary Examiner*—Hwei-Siu Payer
*Attorney, Agent, or Firm*—Ostrolenk, Faber, Gerb & Soffin, LLP

[57] ABSTRACT

A bow saw provided with a handle on the rear end of its bow-shaped frame can be coupled to a rod (32), for instance a telescopic rod, by a rod-attachment coupling. For this purpose, the rear section of the bow-shaped frame (10) has a detent element (34) which is welded on it which is surrounded by the handle shell (30) of the handle and a device insertion pin (36) which is swingably fastened on the frame (10) by fork arms (38) in the region of the detent element (34). This device insertion pin (36) can be form-locked to the detent element (34) in the outward-swung position of the handle so that the device insertion pin (36) protrudes towards the rear and a rod (32) provided with a corresponding insertion hole and a coupling can be pushed onto it. The movement of the device insertion pin (36) into the coupling position is effected by entrainment upon the swinging of the handle shell (30). When the rod is attached via the rod fastening coupling to the bow saw, even distant branches or the like can be cut, but in the uncoupled condition the coupling device does not prevent actuation of the saw when the handle shell is in its inward-swung position.

13 Claims, 2 Drawing Sheets

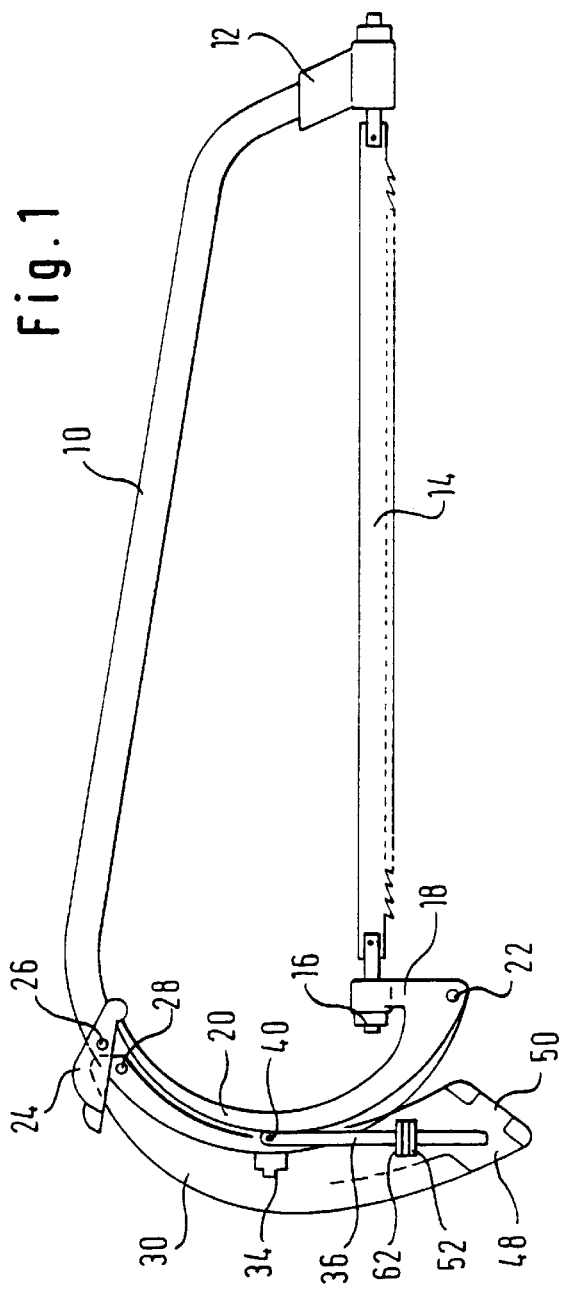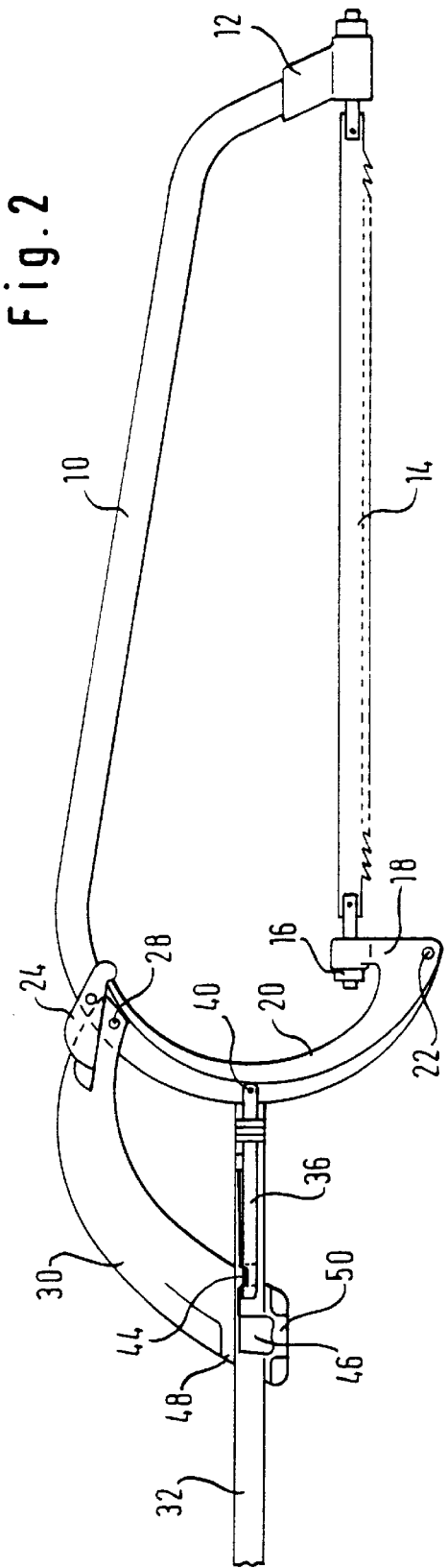

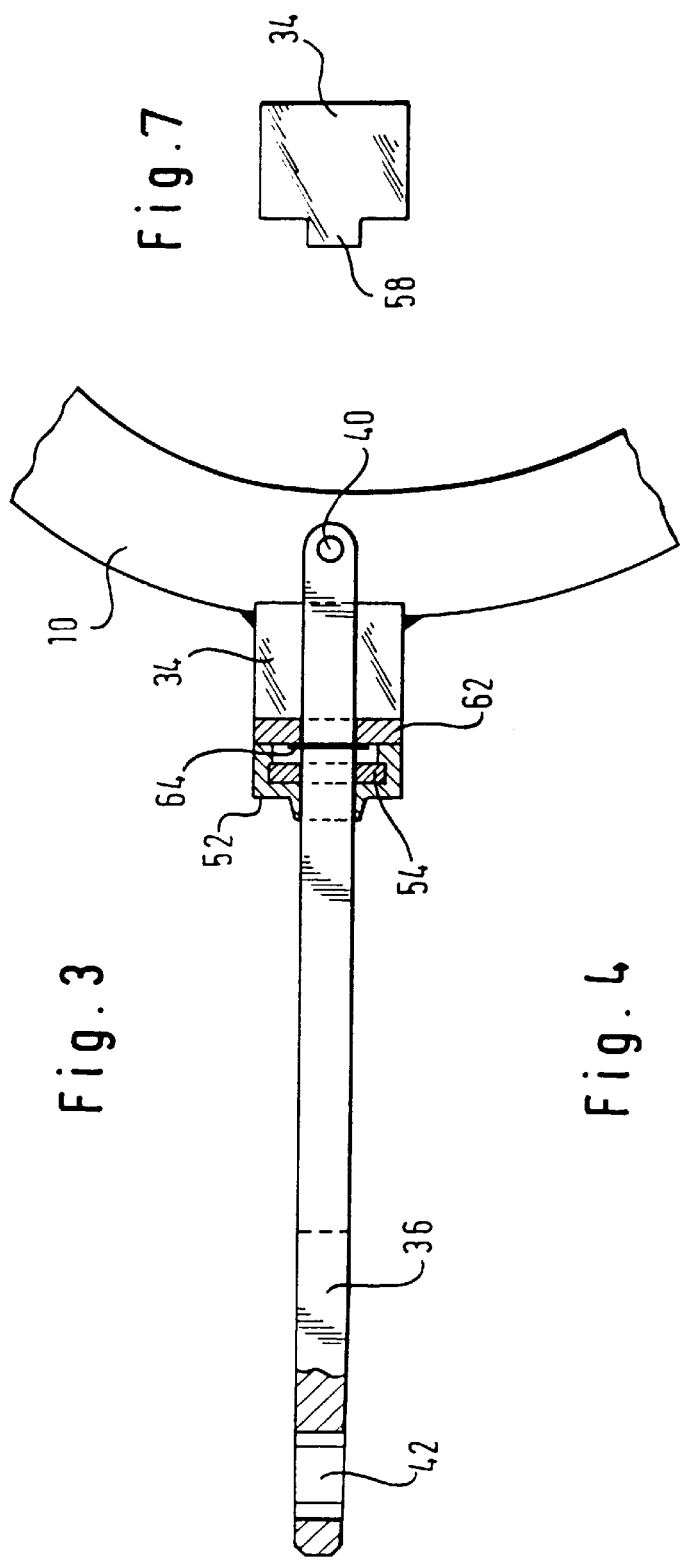
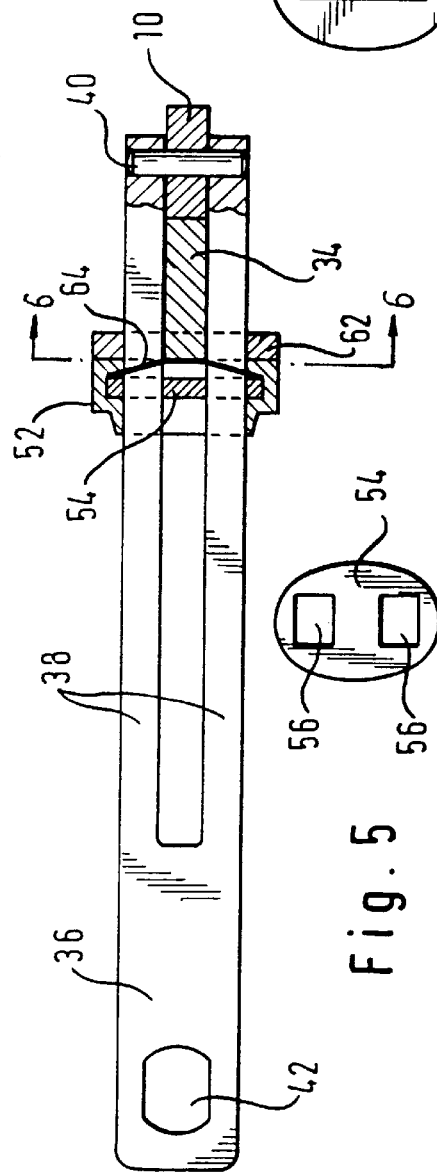

BOW SAW

The present invention relates to a tree saw developed as a bow saw. Such bow saws are available in two variants. The one variant, which is known, for instance, as the Dithmarsch form, has on the rear section of the frame an ergonomically favorably shaped handle by which the saw can be grasped and conveniently operated provided that the branches or other parts to be sawed are near the handle.

If more distant objects, for instance branches which are high up or at a distance away are to be sawed off, saws to which an extension rod can be connected, for instance a telescopic rod, are used. There are saw blades to which either a handle or a rod can be attached via a suitable coupling. For tree saws which are developed as bow saws, the bow-shaped frame has been provided with a cylindrical or conical socket into which an extension rod can be inserted. The handling of such a saw or rod is, however, difficult and unfavorable since a conveniently accessible handle is not present and the saw must be grasped on the frame and/or on the socket.

The object of the present invention is therefore to provide a tree saw which is developed as a bow saw and can be used optionally with the customary ergonomically favorably shaped handle or with an extension rod in order to saw off objects lying at a greater distance away.

This object is achieved by the features set forth in claim 1, taken together. By the arrangement in accordance with the invention of the coupling place on the end of the bow-shaped frame the result is obtained that its presence is not noted and the handling of the saw cannot be impaired since those coupling parts lie embedded within the handle when the saw is operated directly by one's hand. By the swinging-away of a handle piece, which is preferably developed as a handle shell, the coupling elements provided on the saw are, in accordance with one suitable embodiment of the invention, automatically brought into their active position so that after an extension rod has been pushed on a device insertion pin forming the coupling element of the saw, the saw is immediately ready for use.

As rod-attachment coupling, there is preferably used a rod-attachment coupling in accordance with Federal Republic of Germany 31 30 703 C2, but other rod-attachment couplings can also be used, including ones which are already available on the market, provided that they have a coupling element which corresponds to the device insertion pin (or its mating piece) and is swingably pivoted on the bow-shaped frame in such a manner that it is covered by the handle when not in use and which, in coupled position, can be form-locked in one or more positions.

Various developments of the invention can be noted from the dependent claims.

One embodiment of the invention will be described below with reference to the drawing, in which:

FIG. 1 is a side view of a bow saw developed in accordance with the invention, with the handle in inward-swung position, the handle being shown broken open so that the inward-swung device insertion pin is visible;

FIG. 2 shows the bow saw of FIG. 1 with a rod attached via a rod-attachment coupling on the end of the frame;

FIG. 3 shows a side elevation view of the fastening and mounting of the device insertion pin on the end of the frame;

FIG. 4 is a top view thereof;

FIG. 5 is a front view of a safety disk on FIG. 4;

FIG. 6 is a section at 6–6 in FIG. 4; and

FIG. 7 is a side elevation view of a detent member in FIG. 3.

FIG. 1 shows a bow saw of the so-called Dithmarsch type developed as tree saw, such as used in orchards, gardens and vineyards, as well as in the field of construction, by homeowners and the like.

The saw has a bow-shaped frame 10 which bears on its front end a front receiving mounting 12 for the saw blade 14. The rear receiving mounting 16 for the saw blade is arranged in a short lever arm 18 of a tensioning lever 20 which is pivoted via a pivot pin 22 on the rear end of the frame and which is adapted in shape to the rear section of the frame 10. The tensioning lever 20 is secured in the tensioned position by a toggle lever 24 which is pivoted on the frame 10 by means of a pivot pin 26, as can be noted from FIGS. 1 and 2. By means of another pivot pin 28, a handle shell 30 forming the handle is pivoted on the frame 10, the shell so surrounding the rear section of the frame 10 in its inward-swung position (FIG. 1) that the bow saw can be grasped in ergonomically favorable manner when the handle is closed (FIG. 1). The handle shell 30 can be swung out around the pivot pin 28 into the position shown in FIG. 2, in which a rod 32 can be fastened in the manner described below via a rod-attachment coupling to the frame 10 so that the saw can be guided by means of the rod in order to cut branches located at a height or a distance away. Both in the inward-swung position shown in FIG. 1 and in the outward-swung position shown in FIG. 2, the toggle lever 24 can be actuated in order to release or lock the tensioning lever 20, so that in both of the positions shown in FIG. 1 and FIG. 2, the saw blade can be turned around the clamping axis or can be replaced by a new one when it has become worn.

The rod-attachment coupling which creates the connection between the rod 32 and the rear end of the frame is advisedly developed in the manner described in Federal Republic of Germany 31 30 703 C2. However, the invention is not limited to this type of rod-attachment coupling, and other couplings which permit a separating of bow saw and rod can also be used. One requirement is that the handle, i.e. the handle shell 30, can, when the rod is removed, assume the normal position shown in FIG. 1 in which the saw can be handled in an ergonomically favorable manner.

In the central section of the rear frame, a detent element 34 of rectangular cross section is welded-on, it being most clear in the different showings in FIGS. 3–6. A device insertion pin 36 is developed in the form of a fork and its fork arms 38 surround the rear section of the bow-shaped frame 10 and the detent element 34, where it is swingably pivoted via a pivot pin 40. The pivot pin 40 is located in the front extension of the middle axis of the detent element 34 and the arrangement is such that the device insertion pin 36 is so swung in the position shown in FIG. 1 that it is surrounded by the handle shell and does not interfere with the handling of the handle. The device insertion pin 36 has a locking hole 42 into which a coupling leaf spring 44 can engage by a latch, which is built in the rod 32 and can be unlocked by a button 46. As can be noted from FIG. 2, in coupled position the button 46 lies protected within the handle shell 30 so that it cannot be unintentionally loosened by branches or the like. As can furthermore be noted from FIG. 2, the rod 32 passes through the handle shell in a passage hole 48 and the button 46 can be unlocked through a recess 50 in the handle shell in the position shown in FIG. 2.

The form-locked connection between rod 32 and detent element 34 or frame 10 is produced in the following manner.

A sleeve 52 which is adapted at its rear end to the front end of the rod 32 is pushed over the device insertion pin 36. This sleeve 52 surrounds a safety or locking disk 54 which has two guide holes 56 which travel on the fork arms 38 (FIG. 5) whereby the sleeve 52 is prevented from dropping off from the device insertion pin 36. The fork arms 38 of the device insertion pin 36, as can be noted from FIGS. 3 and 4 surround the detent element 34 (FIG. 7), which has a rectangular locking projection 58 which faces the rod 32, and engages, in the position shown in FIGS. 2 and 3, into the rectangular recess 60 in a cap disk 62 which is displaceable on the device insertion pin 36 together with the sleeve 52 and the locking disk 54. A plate spring 64 or leaf spring is provided between the locking disk 54 and the cap disk 62 in order to take up tolerances. In order to fasten a rod 32 by the rod attachment coupling to the bow saw, the handle shell 30 is swung around the pivot pin 28 out of the position shown in FIG. 1 into the position shown in FIG. 2. Upon this swinging movement, the device insertion pin 36 is automatically swung about its pivot pin 40, since its end is carried along via the passage hole 48 of the handle shell or a corresponding inner projection of the handle shell 30. In this position, shown in FIG. 2, the rod 32 can be pushed through the hole 40 in the shell 30, the front end of the rod 32 provided with a device insertion hole and pressing against the sleeve 52 and the device insertion pin 36 and thus preventing the rod 32 from swinging around the pin 40 since the cap disk 62 holds the fork arms 38 fast against the locking extension 58 of the detent element 34.

This locking is produced automatically when the rod 32 is pushed onto the device insertion pin 36.

After the unlocking of the coupling by depressing the button 46, the rod 32 can be removed from the device insertion pin 36 and the sleeve 52 can be pulled back by hand together with the locking disk 54 and cap disk 62, be pulled back by hand in order to open the lock between the disk 62 and the locking projection 58. The handle shell 30 can then be brought back into the position shown in FIG. 1, the device insertion pin 36 being automatically carried along.

LIST OF REFERENCE NUMERALS

10 Bow-shaped frame
12 Mounting bearing
14 Saw blade
16 Read mounting bearing
18 Short lever arm
20 Tensioning lever
22 Pivot pin
24 Toggle lever
26 Pivot pin
28 Pivot pin
30 Handle shell
32 Rod
34 Detent element
36 Device insertion pin
38 Fork arms
40 Pivot pin
42 Hole
44 Coupling leaf spring
46 Button
48 Passage hole
50 Recess
52 Sleeve
54 Locking disk
56 Guide holes
58 Locking projection
60 Rectangular recess
62 Cap disk
64 Plate spring

I claim:

1. A bow saw comprising:

a bow-shaped frame having ends, a saw blade supported on the frame between the ends for being tensioned by the frame; the frame having an end region near one of the frame ends;

a handle swingably pivoted at a first pivot to the end region of the frame, the handle being shaped to cover over a portion of the end region of the frame from the first pivot toward the one frame end;

a pin swingably pivoted at a second pivot to the end region of the frame at a portion of the end region that is covered over by the handle when the handle is pivoted toward the end region of the frame, and with the pin pivoted inwardly toward the end region of the frame, the handle grips over the inwardly pivoted pin;

the pin being swingable outwardly with reference to the end region of the frame, and locking elements for locking the pin in an outwardly swung position.

2. The bow saw of claim 1, further comprising a device for the saw which is received on the outwardly swung pin;

the handle having a first end at the first pivot and having a section away from the first pivot;

the handle section including a portion thereof for receiving the device when the handle is swung outward and the device is on the pin.

3. The bow saw of claim 2, wherein the device includes a rod that is received on the pin and the rod is received in the section of the handle.

4. The bow saw of claim 3, further comprising an unlocking button in the section of the handle for unlocking the rod.

5. The bow saw of claim 4, further comprising a recess at the section of the handle and the unlocking button is accessible through the recess when the handle is pivoted to an outwardly swung position.

6. The bow saw of claim 2, wherein the pin has a fork shape including fork arms that straddle the end region of the frame, a pivot pin connection at the second pivot between the fork arms and the end region of the frame.

7. The bow saw of claim 2, wherein the pin has a fork shape, including fork arms, a detent element placed on the end region of the frame, a pivot pin connection at the second pivot between the fork arms and the detent element.

8. The bow saw of claim 7, wherein the device includes a rod that is received on the pin and the rod is received in the section of the handle;

the detent element including a locking projection;

a sleeve around the pin and around the fork arms thereof for defining a stop for the rod placed on the pin;

a cap disk located on the pin and also around the fork arms and being displaceable together with the sleeve, the cap disk having a locking position where the cap disk surrounds the fork arms and the locking projection extending from the detent element inside the sleeve.

9. The bow saw of claim 8, further comprising a third pivot coupling between the pin and the handle away from the first and second pivots of the handle and the pin, such that upon swinging out of the handle, the pin is also swung-out; and wherein the sleeve and the cap disk are automatically brought into a locking position when the rod is placed on the pin.

10. The bow saw of claim 8, further comprising a locking disk within the sleeve, the locking disk including holes therethrough which receive the fork arms and the locking disk is slidable on the fork arms; the locking disk including a portion between the holes thereof which defines a stop limitation at the base of the fork arms.

11. The bow saw of claim 10, further comprising a play equalization spring between the locking disk and the cap disk.

12. The bow saw of claim 1, further comprising a third pivot coupling between the pin and the handle away from the first and second pivots of the handle and the pin, such that upon swinging out of the handle, the pin is also swung-out.

13. The bow saw of claim 1, further comprising a tensioning lever on the bow-shaped frame for tensioning the saw blade between the ends of the frame; a toggle lever for fastening the tensioning lever on the frame, wherein the toggle lever and the tensioning lever are freely actuatable in every swing position of the handle.

\* \* \* \* \*